United States Patent [19]

Yamazaki et al.

[11] Patent Number: 5,023,946
[45] Date of Patent: Jun. 11, 1991

[54] POLARIZATION DIVERSITY OPTICAL HETERODYNE RECEIVER WITH PHASE ADJUSTMENT OF TWO I.F. SIGNALS FOR CONTROL OF A LOCAL OPTICAL SOURCE

[75] Inventors: Shuntaro Yamazaki; Makoto Shibutani, both of Tokyo, Japan

[73] Assignee: NEC Corporation, Tokyo, Japan

[21] Appl. No.: 386,072

[22] Filed: Jul. 28, 1989

[30] Foreign Application Priority Data

Jul. 29, 1988 [JP] Japan ................................. 63-191496
Jul. 29, 1988 [JP] Japan ................................. 62-191497

[51] Int. Cl.⁵ .......................................... H04J 10/06
[52] U.S. Cl. .................................................. 455/619
[58] Field of Search ............................ 455/616/619

[56] References Cited

U.S. PATENT DOCUMENTS 4,829,598 5/1989 Auracher ........................... 455/619

FOREIGN PATENT DOCUMENTS 0322893 7/1989 European Pat. Off. ............ 455/619
0154036 6/1989 Japan ................................... 455/616

OTHER PUBLICATIONS

K. Emura, M. Shikada, S. Yamazaki, K. Komatsu, I. Moto, and K. Mineumua, "400 Mb/s Optical DPSK Heterodyne Detection Experiments Using DBR Laser Diodes With External Optical Feedback", i IOOC–ECOC '85, Venice, Oct. 1985, pp. 401–404.

Yoshihisa Yamamoto, "Coherent Optical Fiber Transmission", IEEE Journal of Quantum Electronics, vol. QE-17, No. 6, Jun. 1981, pp. 919–935.

B. Glance, "Polirization Independent Coherent Optical Receiver", Journal of Lightwave Technology, vol. LT-5, No. 2, Feb. 1987, pp. 274–276.

Primary Examiner—Reinhard J. Eisenzopf
Assistant Examiner—Leslie Van Beek
Attorney, Agent, or Firm—Sughrue, Mion, Zinn, Macpeak & Seas

[57] ABSTRACT

Two intermediate frequency signals, which are used in a polarization diversity optical heterodyne receiver operable according to demodulation and subsequent combination and have a common intermediate signal frequency variable in an intermediate frequency range, are subjected to delaying relative to each other and then combined into a combined intermediate frequency signal. A frequency discriminator (24) discriminates the intermediate signal frequency of the combined intermediate frequency signal to produce a control signal for use in stabilizing a local optical frequency of a local beam used in combination with a signal beam susceptible to polarization fluctuation. A delay may be given for the delaying to one of the two intermediate frequency signals alone. Alternatively, a delay may be given for the delaying to only one of two local beam components which are coupled to two signal beam components for use in producing the two intermediate frequency signals.

3 Claims, 5 Drawing Sheets

POLARIZATION DIVERSITY OPTICAL HETERODYNE RECEIVER WITH PHASE ADJUSTMENT OF TWO I.F. SIGNALS FOR CONTROL OF A LOCAL OPTICAL SOURCE

BACKGROUND OF THE INVENTION

This invention relates to a polarization diversity optical heterodyne receiver with demodulation and subsequent combination of two intermediate frequency (I.F.) signals.

An optical heterodyne detection communication (coherent optical communication) network is advantageous in long-distance and high-frequency-density transmission of signal beams because of its high reception sensitivity and its high frequency utilization capability in the manner described in an article contributed by Yoshihisa Yamamoto et al to the IEEE Journal of Quantum Electronics, Volume QE-17, No. 6 (June 1981), pages 919 to 935, under the title of "Coherent Optical Fiber Transmission Systems". When used in the network, a receiver is supplied with a signal beam carrying information and comprises a local optical source for generating a local beam, a beam coupler for coupling the signal and the local beams into a coupled or mixed beam, an optical detector or photodetector for detecting the coupled beam to produce an intermediate frequency signal, and a demodulator for demodulating the intermediate frequency signal to produce a reproduction of the information as a baseband signal.

It is inevitable that the signal beam is undesiredly subjected to fluctuation in its polarization state upon arrival at the receiver. As a result, the polarization state of the signal beam is not necessarily coincident with the polarization state of the local beam. This adversely affects the reception sensitivity. Furthermore, the local beam has an optical frequency which is subject to variation. This adversely affects reception characteristics or performance of the receiver. It is therefore mandatory in the receiver to compensate for the polarization fluctuation of the signal beam and to stabilize the optical frequency of the local beam.

Polarization diversity reception is effective in an optical heterodyne receiver in compensating for the polarization fluctuation of the signal beam. A polarization diversity optical heterodyne receiver comprises a beam splitting part supplied with the signal and the local beams for producing first and second coupled beams which are orthogonally polarized, a first optical detector for detecting the first coupled beam to produce a first intermediate frequency signal, a second optical detector for detecting the second coupled beam to produce a second intermediate frequency signal, and a processing part for processing the first and the second intermediate frequency signals into the baseband signal which is stable against the polarization fluctuation.

In the processing part, the first and the second intermediate frequency signals may first be combined into a combined intermediate frequency signal and then demodulated into the baseband signal. It is necessary in this event to preliminarily phase adjust the first and the second intermediate frequency signals for subsequent combination. Alternatively, the first and the second intermediate frequency signals may first be demodulated into first and second demodulated signals for subsequent combination into the baseband signal.

A processing part for subjecting the first and the second intermediate frequency signals to demodulation combination, namely, to demodulation and subsequent combination, is advantageous because the receiver is simple in structure and has a less deteriorated reception sensitivity. The simple structure is evident from unnecessity of a phase adjuster for preliminarily phase adjusting the first and the second intermediate frequency signals before supply to the processing part. The less deteriorated reception sensitivity is described, for example, in an article contributed by B. Glance to the Journal of Lightwave Technology, Volume 5 (1987), page 274, under the title of "Polarization Independent Coherent Optical Receiver". Glance theoretically shows in his article that a deterioration in the reception sensitivity is 0.4 dB in a polarization diversity optical heterodyne receiver in which combination follows demodulation carried out according to differential PSK detection.

In the polarization diversity optical heterodyne receiver, the frequency variation in the local beam results in a frequency variation of the first and the second intermediate frequency signals. In order to frequency stabilize the local beam, a frequency discriminating device is used in frequency discriminating the first and the second intermediate frequency signals to produce a control signal for use in the local optical source in controlling the optical frequency. For frequency discrimination, the first and the second intermediate frequency signals may preliminarily be combined into a single combined intermediate frequency signal. It is to be noted in this connection that each of the first and the second intermediate frequency signals has a phase and a power level which are unavoidably subjected to fluctuation due to the polarization fluctuation of the signal beam. As a consequence, the combined intermediate frequency signal disappears in a worst case where the first and the second intermediate frequency signals cancel each other. It is therefore mandatory to use two frequency discriminators in the frequency discriminating device. This undesiredly renders the polarization diversity optical heterodyne receiver bulky and expensive.

SUMMARY OF THE INVENTION

It is therefore an object of the present invention to provide a compact and inexpensive polarization diversity optical heterodyne receiver for receiving a signal beam by coupling the signal beam with a local beam having a local optical frequency which may inevitably vary.

It is another object of this invention to provide a polarization diversity optical heterodyne receiver of the type described, which comprises a single frequency discriminator for use in stabilizing the local optical frequency.

Other objects of this invention will become clear as the description proceeds.

On describing the gist of this invention, it is possible to understand that a polarization diversity optical heterodyne receiver is for receiving a signal beam and comprises a local optical source for generating a local beam of a controllable frequency, a beam splitting part supplied with the signal and the local beams for producing first and second coupled beams which are orthogonally polarized, a first optical detector for detecting the first coupled beam to produce a first intermediate frequency signal, a second optical detector for detecting the second coupled beam to produce a second intermediate frequency signal, and a processing part for processing the first and the second intermediate frequency signals to demodulation combination to produce a baseband signal.

According to this invention, the above-understood polarization diversity optical heterodyne receiver is characterised by delay introducing means for introducing a delay between the first and the second intermediate frequency signals with respect to each other so as to produce first and second delay introduced signals, respectively, a combiner for combining the first and the second delay introduced signals into a combined signal, a frequency discriminator for frequency discriminating the combined signal to produce a control signal, and means for supplying the control signal to the local optical source to control the controllable frequency.

It is possible according to this invention to use the delay introducing means in connection with either the first and the second intermediate frequency signals or the local beam.

According to a first aspect of this invention, the delay introducing means comprises a signal delay line for giving a delay to the first intermediate frequency signal to produce a delayed signal, and means for supplying the delay introduced signal to the combiner as the first delayed signal with the second intermediate frequency signal used as the second delay introduced signal as it stands.

In a polarization diversity optical heterodyne receiver according to a second aspect of this invetion, the beam splitting part comprises a polarization beam splitter for splitting the signal beam into first and second signal beam components which are orthogonally polarized, beam splitting means for splitting the local beam into first and second local beam components which are orthogonally polarized, a first beam coupler for coupling the first signal and the first local beam components into the first coupled beam, and a second beam coupler for coupling the second signal and the second local beam components into the second coupled beam. In this event, the delay introducing means comprises an optical delay line for giving a delay to the first local beam component so as to produce a delayed beam component, and means for supplying the delayed beam component to the first beam coupler to make the first beam coupler couple the first signal and the delayed beam components into the first coupled beam.

DESCRIPTION OF THE PREFERRED EMBODIMENTS

Figure 1:
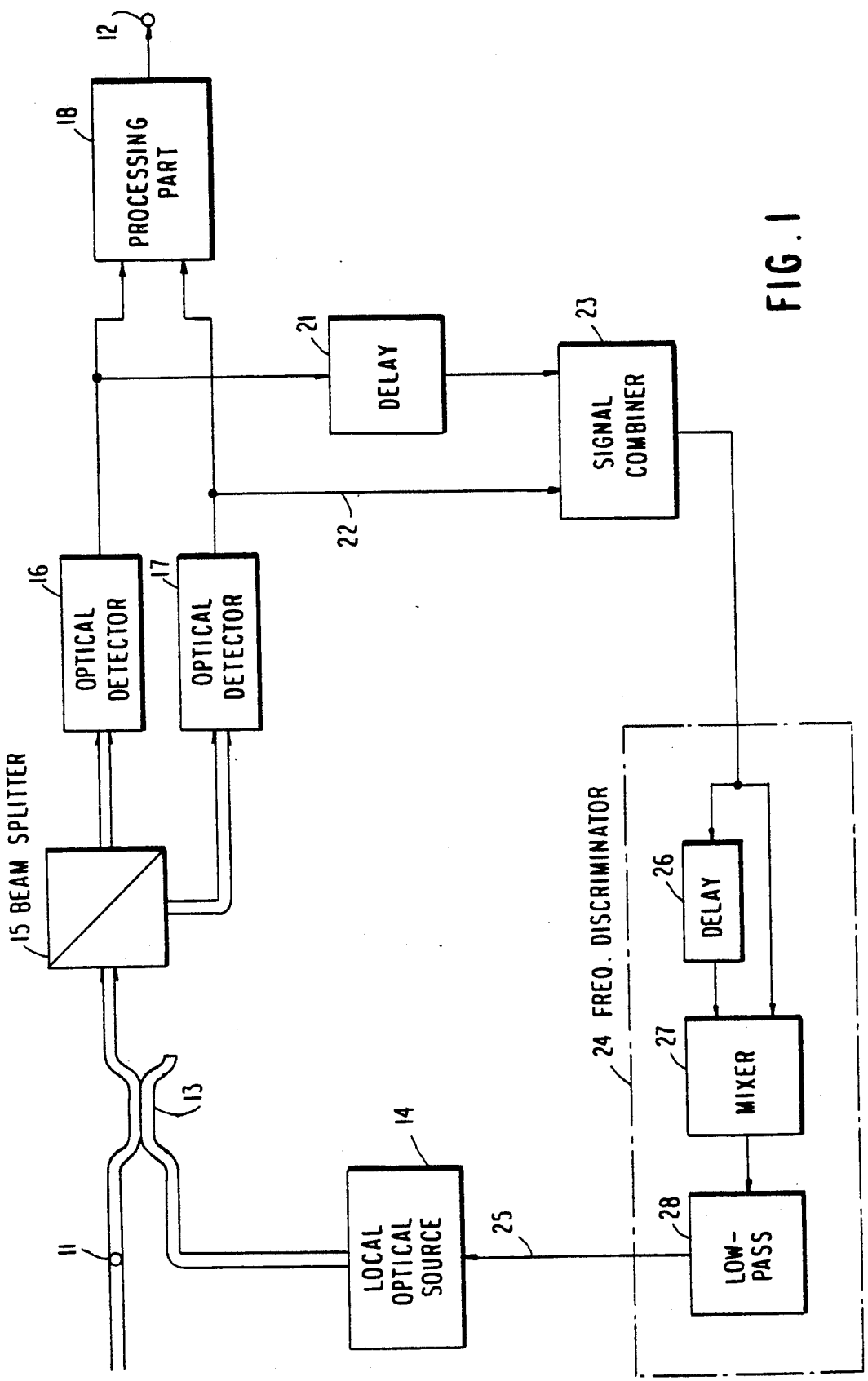
FIG. 1 is a block diagram of a polarization diversity optical heterodyne receiver according to a first embodiment of the instant invention.

Referring to FIG. 1, the description will begin with a polarization diversity optical heterodyne receiver according to a first embodiment of the present invention. The receiver has receiver input and output terminals 11 and 12. The receiver input terminal 11 is connected to a network optical fiber. Through the network optical fiber, the receiver input terminal 11 is supplied with a signal beam which has a stable signal optical frequency, is modulated by information according to, for example, 2 Gb/s differential PSK modulation, and is susceptible to polarization fluctuation, namely, to fluctuation in its polarization state. Through a signal input optical fiber, the signal beam is delivered to a beam coupler 13.

A local optical source 14 generates a local beam with a controllable local optical frequency. It is to be noted that the local optical frequency is undesiredly subjected to variation although controllable. In the example being illustrated, the local optical frequency has a nominal optical frequency difference of 4 GHz relative to the signal optical frequency. In any event, the local beam is delivered to the beam coupler 13 through a local input optical fiber.

Supplied with the signal and the local beams, the beam coupler 13 produces a coupled or mixed beam. A polarization beam splitter 15 splits the coupled beam into first and second coupled beams which are orthogonally polarized.

It is now understood that a combination of the beam coupler 13 and the polarization beam splitter 15 serves as a beam splitting part. Supplied with the signal and the local beams, the beam splitting part produces the first and the second coupled beams.

A first optical detector or photodetector 16 detects the first coupled beam and produces a first intermediate frequency signal of an intermediate signal frequency which is equal to the optical frequency difference. Supplied with the second coupled beam, a second optical detector 17 produces a second intermediate frequency signal of the intermediate signal frequency.

A processing part 18 demodulates the first and the second intermediate frequency signals by differential PSK detection into first and second demodulated signals and subsequently combines the first and the second demodulated signals into a reproduction of the information to supply the receiver output terminal 12 with the reproduction as a baseband signal which is stable against the polarization fluctuation. The differential PSK detection is discussed in detail by Emura in a Technical Digest of IOOC-ECOC '85, page 401, under the title of "400 Mb/s Optical DPSK Heterodyne Detection Experiments Using DBR Laser Diode with External Optical Feedback".

In order to frequency stabilize the local optical beam, a signal delay line 21 introduces a delay to the first intermediate frequency signal and produces a delay introduced signal. The second intermediate frequency signal is transmitted through a signal line 22 to have a delay time relative to the delay introduced signal. Inasmuch as the first and second intermediate frequency signals are phased relative to each other in this manner, the delay introduced signal and the second intermediate frequency signal are herein called first and second delay introduced signals. A combination of the signal delay line 21 and the signal line 22 serves as a delay introduing means for delaying the first and the second intermediate frequency signals into the first and the second delay introduced signals, respectively. A signal combiner 23 is used in combining the first and the second delay introduced signals into a combined intermediate frequency signal having the intermediate signal frequency which is variable within an intermediate frequency range due to an inevitable frequency variation in the local optical frequency.

A frequency discriminator 24 frequency discriminates the combined intermediate frequency signal and produces a control signal which depends on the frequency variation in the local optical frequency and is fed back to the local optical source 14 through a feedback line 25 to suppress the frequency variation and thereby to stabilize the local optical frequency.

In the illustrated example, the frequency discriminator 24 comprises a discriminator delay line 26 responsive to the combined intermediate frequency signal for producing a delayed intermediate frequency signal in the known manner. Supplied with the delayed intermediate frequency signal and with the combined intermediate frequency signal directly from the signal combiner 23, a mixer 27 produces a mixed signal, which is delivered to a low-pass filter 28 for producing the control signal.

Figure 2:
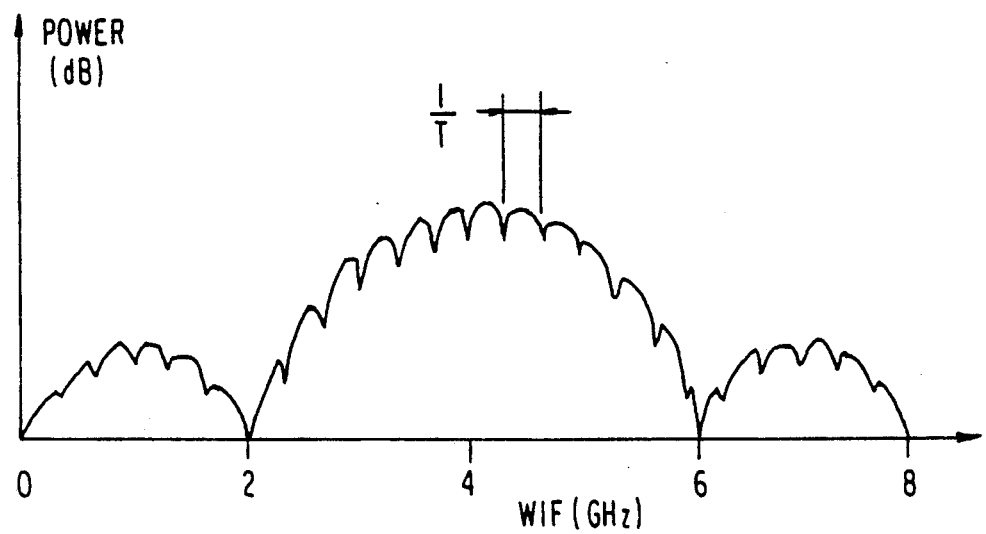
FIG. 2 is a schematic representation of a combined intermediate frequency signal which is used in the polarization diversity optical heterodyne receiver depicted in FIG. 1.

Turning to FIG. 2, the combined intermediate frequency signal has a power level which a curve schematically shows versus the intermediate signal frequency indicated at WIF. It is seen that the power level is highest when the intermediate signal frequency is 4 GHz and that the intermediate frequency range is between 0 and 8 GHz.

When seen more in detail, the curve has a plurality of downwardly going indents at a common frequency spacing which is equal to $1/\tau$, where $\tau$ represents the delay introduced by the signal delay line 21 (FIG. 1) to the first intermediate frequency signal. The downwardly going indents are results of cancellation with each other of the delay introduced signal and the second intermediate frequency signal in the combined intermediate frequency signal and become deepest when the delay introduced signal and the second intermediate frequency signal have a common intensity, namely, when the polarization state of the signal beam is such that the polarization beam splitter 15 (FIG. 1) splits the coupled beam into the first and the second coupled beams with a one-to-one splitting ratio.

If the combined intermediate frequency signal were given a zero power level throughout the intermediate frequency range due to complete cancellation with each other of the first and the second intermediate frequency signals, it is impossible to obtain the control signal for use in stabilizing the local optical frequency. If the power level were reduced throughout the intermediate frequency range due to partial cancellation with each other of the first and the second intermediate frequency signals, stabilization of the local optical frequency is adversely affected. In marked contrast, the combined intermediate frequency signal is subjected to reduction in the power level not throughout the intermediate frequency range but only at the common frequency spacing. Furthermore, the frequency spacing becomes narrow so as to only negligibly adversely affect the stabilization when the delay is sufficiently great.

It has been confirmed by the present joint inventors that use of a 6-meter coaxial cable as the signal delay line 21 was sufficient in stabilizing the local optical frequency and thereby the intermediate signal frequency at 4 GHz and that the frequency variation was below 10 MHz in each of the first and the second intermediate frequency signals irrespective of the polarization fluctuation of the signal beam. It has furthermore been confirmed that the signal delay line 21 can be implemented by a strip line or a wide-band amplifier having a bandwidth sufficiently as wide as that of the coaxial cable. When the signal beam is modulated at a low bit rate, the signal delay line 21 can be implemented by an LC circuit.

Figure 3:
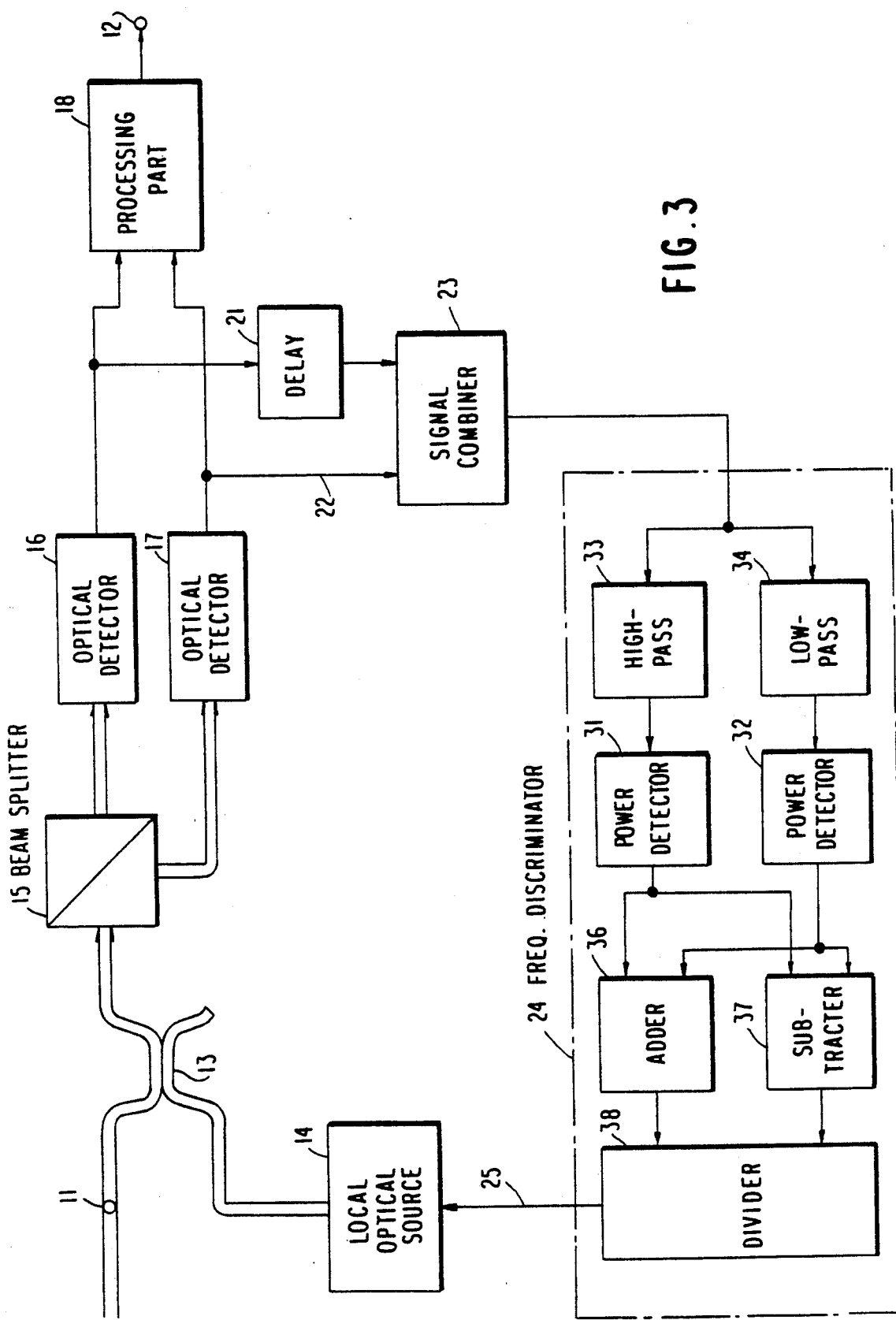
FIG. 3 is a block diagram of a polarization diversity optical heterodyne receiver according to a second embodiment of this invention.

Referring to FIG. 3, a polarization diversity optical heterodyne receiver is similarly excellently operable according to a second embodiment of this invention. Similar parts are designated by like reference numerals and are operable with likewise named optical and electrical signals.

In FIG. 3, the frequency discriminator 24 comprises first and second power detectors 31 and 32 supplied with the combined intermediate frequency signal through a high-pass filter 33 and a low-pass filter 34, respectively, which have a common cutoff frequency at the nominal optical frequency difference which is 4 GHz in the illustrated example. The first power detector 31 detects the power level of a higher frequency component of the combined intermediate frequency signal to deliver a first output signal to an adder 36 and to a subtracter 37. The second power detector 32 detects the power level of a lower frequency component of the combined intermediate frequency signal to deliver a second output signal to the adder 36 and the subtracter 37. The adder 36 produces a sum signal. The subtracter 37 produces a difference signal.

In FIG. 3, a divider 38 is used in dividing the difference signal by the sum signal to produce the control signal and to deliver the control signal to the feedback line 25. The control signal varies solely with the variation in the signal frequency difference depending neither on the power level of the first and the second intermediate frequency signals nor on the power level of the combined intermediate frequency signal.

It has been confirmed by the present inventors that the local optical frequency and the intermediate signal frequency are stabilized according to the nominal frequency difference of 4 GHz with a frequency variation kept below 5 MHz independently of the polarization fluctuation of the signal beam when the signal delay line 21 was a 6-meter coaxial cable. The delay line 21 may be implemented by an equivalent strip line, wide-band amplifier, or LC circuit.

Figure 4:
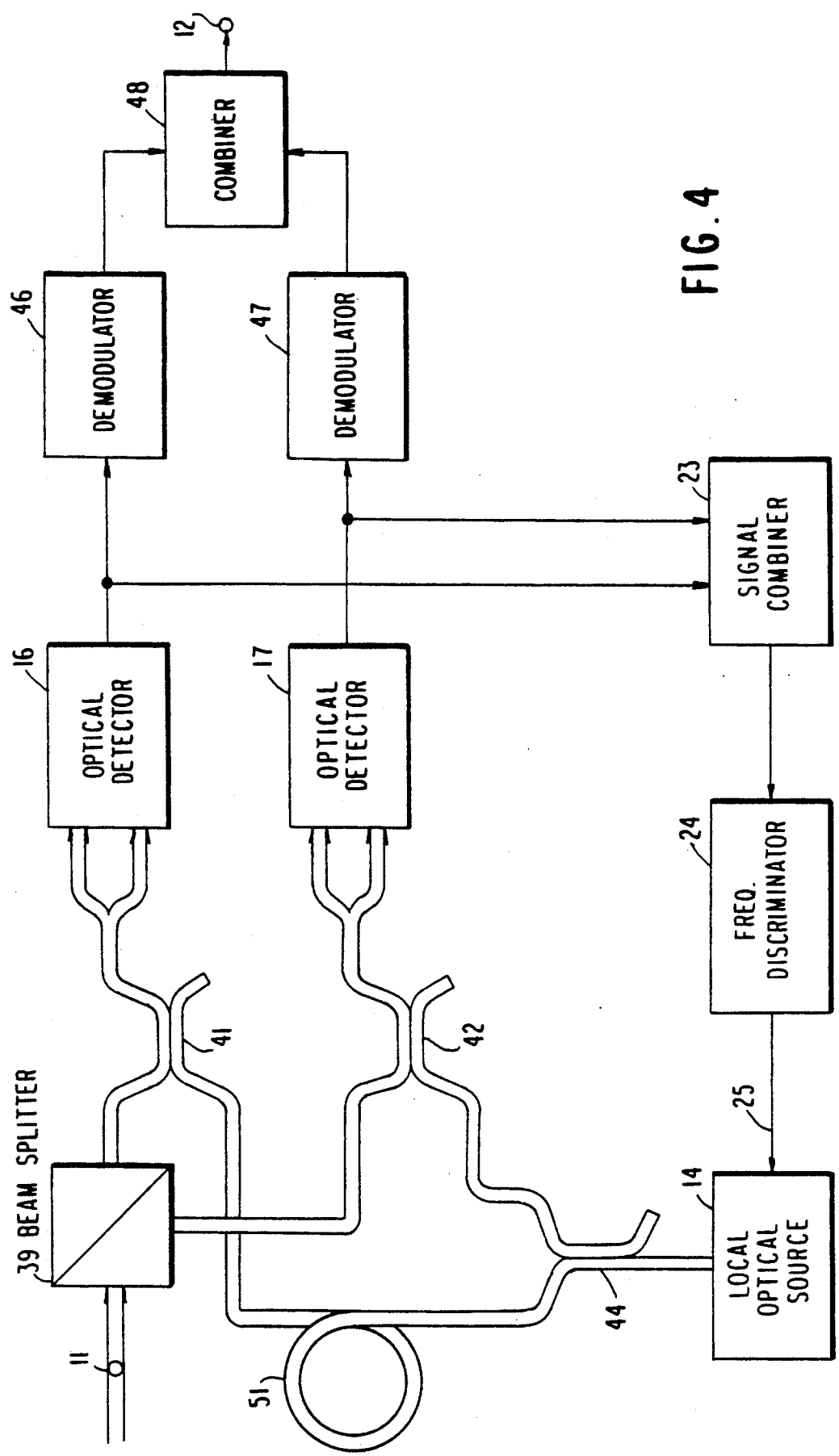
FIG. 4 is a block diagram of a polarization diversity optical heterodyne receiver according to a third embodiment of this invention.

Referring now to FIG. 4, the description will proceed to a polarization diversity optical heterodyne receiver according to a third embodiment of this invention. Similar parts are designated by like reference numerals and are operable with likewise named optical and electrical signals. It will be assumed merely by way of example that the signal beam is modulated by information according to 400 Mb/s FSK modulation.

In FIG. 4, the signal beam is delivered through the signal input optical fiber to a signal beam splitter 39 which is a polarization beam splitter. From the signal beam splitter 39, first and second signal beam components are supplied to first and second beam couplers 41 and 42, respectively, with an orthogonally polarized relationship. Delivered through the local input optical fiber, the local beam is divided by an optical fiber divider 44 into first and second local beam components with a one-to-one division ratio for supply to first and second local optical fibers, respectively, and thence to the first and the second beam couplers 41 and 42. While transmitted through the first and the second local optical fibers, the first and the second beam components are orthogonally polarized in the known manner on arriving at the beam couplers 41 and 42.

Each of the first and the second optical detectors 16 and 17 is a balanced receiver. The fact is illustrated by bifurcating each of optical fibers between the first beam coupler 41 and the first optical detector 16 and between the second beam coupler 42 and the second optical detector 17. Each optical detector 16 or 17 carries out suppression of intensity noise which is present in the local beam. The processing part 18 (FIG. 1) is depicted in more detail as a combination of first and second demodulators 46 and 47 and a processor combiner 48. Each of the demodulators 46 and 47 is a 400 Mb/s FSK single-filter detector in the example being illustrated. The first and the second demodulators 46 and 47 produce first and second demodulated signals, which are combined by the processor combiner 48 into the baseband signal for supply to the receiver output terminal 12.

In FIG. 4, the polarization diversity optical heterodyne receiver comprises a delay introducing means comprising an optical delay line 51 in the first local optical fiber. The second local beam component is transmitted through the second local optical fiber without are introduced delay. The first local beam component is therefore supplied to the first beam coupler 41 as a phase adjusted beam component which has a time difference relative to the second local beam component. It has been confirmed by the present inventors that the optical delay line 51 is preferably a 5-meter long optical fiber.

The first beam coupler 41 couples the first signal and the phase adjusted beam components into a first coupled beam. The second beam coupler 42 couples the second signal and the second local beam components into a second coupled beam. The first coupled beam has the optical phase difference relative to the second coupled beam. It is therefore possible to understand that the first and the second optical detectors 16 and 17 produce first and second delay introduced signals. as the first and the second intermediate frequency signals. This does not necessarily mean that the first and the seoond delay introduced signals have time delays which are subjected to an appreciable signal delay.

A smaller combination of the optical fiber divider 44 and the first and the second local optical fibers serves as a beam splitting arrangement for splitting the local beam into the first and the second local beam components. A greater combination of the signal beam splitter 39, the beam splitting arrangement, and the first and the second beam couplers 41 and 42 serves as the beam splitting part defined before.

Figure 5A:
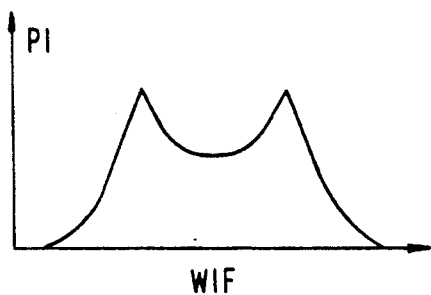
FIGS. 5A, 5B, and 5C are schematic representations of intermediate frequency signals which are used in the receiver illustrated in FIG. 4.
Figure 5B:
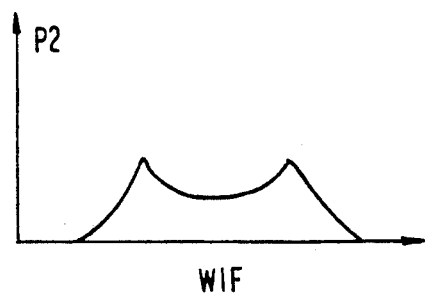
Figure 5C:
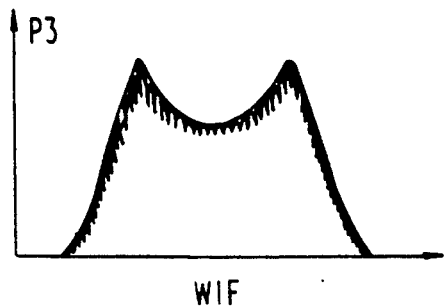

Turning to FIGS. 5A through 5C, the first phased signal has a first power level Pl which is schematically illustrated in FIG. 5A versus the intermediate signal frequency WIF. The second phased signal has a second power level P2 similarly depicted in FIG. 5B versus the intermediate signal frequency WIF. Each of the first and the second power levels Pl and P2 is variable between zero and a maximum power level depending on the polarization state which the signal beam has on arriving at the receiver input terminal 11 (FIG. 4).

The combined intermediate frequency signal has a sum power level Ps schematically shown in FIG. 5C versus the intermediate signal frequency WIF. Due to a slight correlation between the phases of the first and the second phased signals, slight interference fringes are observed in the sum power level Ps. If the first and the second local beam components were not given the time difference, the sum power level Ps would be a variable power level variable between zero and its maximum power level. In marked contrast, it has been confirmed by the present inventors that the time difference makes it possible to keep the variable power level always above a predetermined power level which can make the control signal stabilize the local optical frequency as desired.

Figure 6:
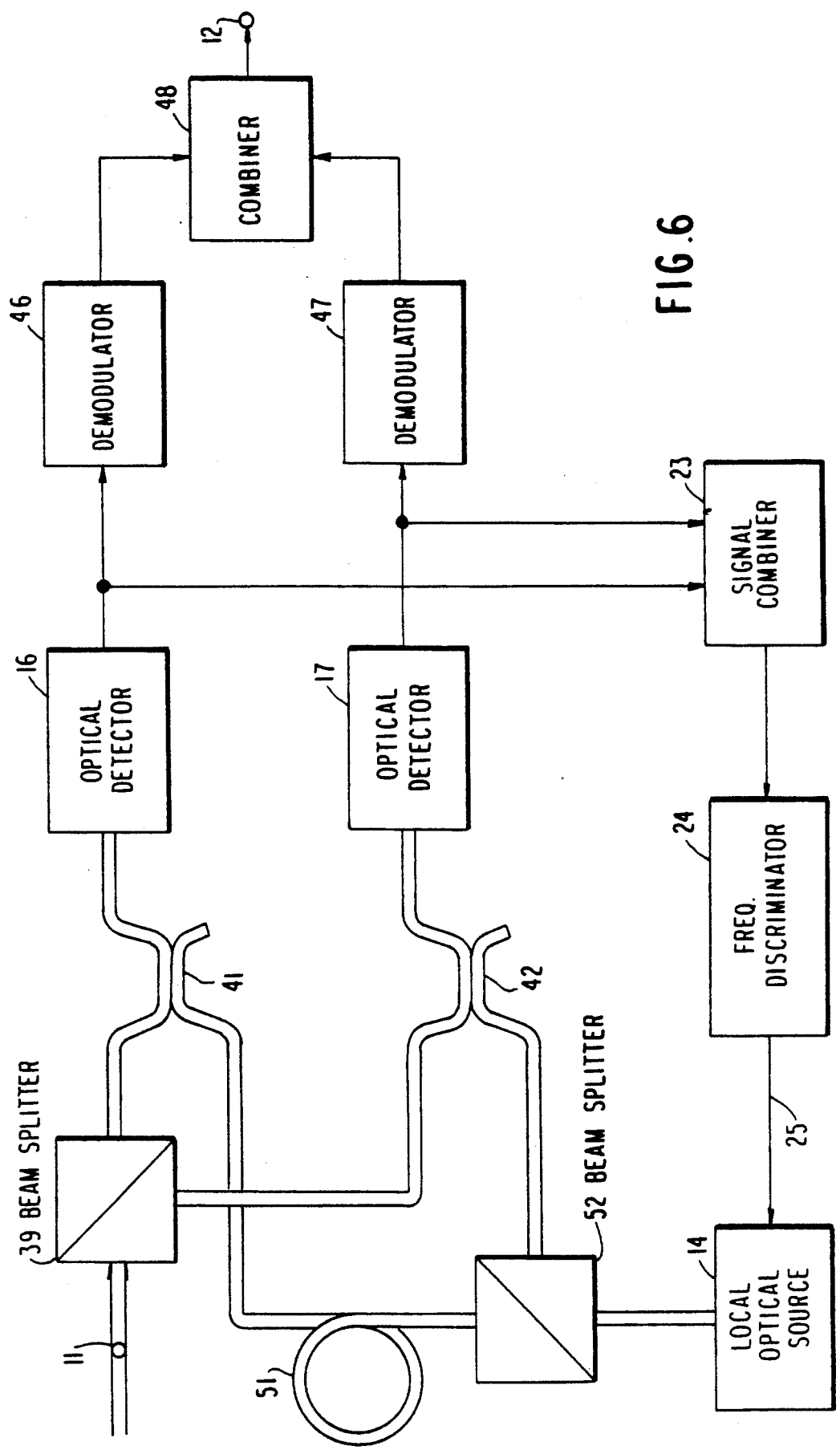
FIG. 6 is a block diagram of a polarization diversity optical heterodyne receiver according to a fourth embodiment of this invention.

Referring to FIG. 6, attention will finally be directed to a polarization diversity optical heterodyne receiver according to a fourth embodiment of this invention. Similar parts are designated by like reference numerals and are operable with likewise named optical and electrical signals.

In FIG. 6, a local beam splitter 52 is used in place of the optical fiber divider 44 described in conjunction with FIG. 4. The first local optical fiber comprises the optical delay line 51 as before. Each of the optical detectors 16 and 17 is a single-detector receiver. It has been confirmed that a 6-meter long optical fiber is preferable as the optical delay line 51 as before.

While this invention has thus far been described in specific connection with a few preferred embodiments thereof, it will now be readily possible for one skilled in the art to put this invention into effect in various other manners. For example, it is possible in FIGS. 1, 3, 4, and 6 to interchange various parts of the polarization diversity optical heterodyne receiver. The signal delay line 21 can be designed with reference to the 6-meter long coaxial cable and to the common frequency spacing described above. The optical delay line 51 should be a longer optical fiber when the local beam has a narrow spectrum width. The signal beam may be modulated by any of the ASK and the PSK modulation and at different bit rate.

What is claimed is:

1. A polarization diversity optical heterodyne receiver for receiving a signal beam, comprising:
   a local optical source for generating a local beam of a controllable frequency;
   a beam splitting part supplies with said signal and said local beam for producing first and second coupled beams which are orthogonally polarized, said beam splitting part comprising:
   a polarization beam splitter for splitting said signal beam into first and second signal beam components which are orthogonally polarized:
   beam splitting means for splitting said local beam into first and second local beams which are orthogonally polarized:
   a first beam coupler for coupling said first signal and said first local beam components into said first coupled beam:
   a second beam coupler for coupling said second signal and said second local beam components into said second coupled beam:
   a first optical detector for detetcing said first coupled beam to produce a first intermediate frequency;
   a second optical detector for detecting said second coupled beam to produce a second intermediate frequency signal;
   a processing part for subjecting said first and said second intermediate frequency signals to demodulation combination to produce a baseband signal;

delay introducing means for introducing a delay between said first and second intermediate frequency signals to produce first and second delay introduced signals, respectively, wherein said first and second delay introduced signals are delayed with respect to each other, said delay introducing means comprising:
  an optical delay line for introducing a delay to said first local beam component to produce a delayed beam component;
  means for supplying said delayed beam component to said first beam coupler to make said first beam coupler couple said first signal and said delayed beam component into said first coupled beam;
  a combiner for combining said first and second delay introduced signals into a combined signal;
  a frequency discriminator for frequency discriminating said combined beam to produce a control signal; and
  means for supplying said control signal to said local optical source to control said controllable frequency.

2. A polarization diversity optical heterodyne receiver as claimed in claim 1, wherein said combiner produces said combined signal with a variable power level, and wherein the delay of said optical delay line is selected so as to keep said variable power level above a predetermined power level.

3. A polarization diversity optical heterodyne receiver for receiving a signal beam, comprising:

a local optical source for generating a local beam of a controllable frequency;
  a beam splitting part supplies with said signal and said local beam for producing first and second coupled beams which are orthogonally polarized;
  a first optical detector for detecting said first coupled beam to produce a first intermediate frequency signal;
  a second optical detector for detecting said second coupled beam to produce a second intermediate frequency signal;
  a processing part for subjecting said first and second intermediate frequency signals to demodulation combination to produce a baseband signal;
  delay introducing means for introducing a delay between said first and second intermediate frequency signals to produce first and second delay introduced signals, respectively, wherein said first and second delay introduced signals are delayed with respect to each other, said delay introducing means comprising:
    a signal delay line for introducing a delay to said first intermediate frequency signal to produce a delay introduced signal, wherein said delay is selected so as to make said frequency versus power characteristic have a plurality of power reduced parts which have a sufficiently narrow common frequency spacing such that said plurality of power reduced parts little effect control of said controllable frequency;
    means for supplying said delay introduced signal to said combiner as said first delay introduced signal with said second intermediate signal used as said second delay introduced signal as it stands;
    a combiner for combining said first and second delay introduced signals into a combined signal, said combiner producing said combined signal having at least one power reduced part;
    a frequency discriminator for frequency discriminating said combined signal to produce a control signal; and
    means for supplying said control signal to said local optical source to control said controllable frequency.

* * * * *

UNITED STATES PATENT AND TRADEMARK OFFICE
CERTIFICATE OF CORRECTION

PATENT NO. : 5,023,946
DATED : June 11, 1991
INVENTOR(S) : Shuntaro YAMAZAKI and Makoto SHIBUTANI It is certified that error appears in the above-identified patent and that said Letters Patent is hereby corrected as shown below:

Col. 7, line 28, delete "are" and insert --an--;

line 43, delete ".";

line 45, delete "seoond" and insert --second--;

Col. 8, line 62, after "frequency" insert --signal--;

Col. 9, line 38, delete "supplies" and insert --supplied--.

Signed and Sealed this

Tenth Day of November, 1992

Attest:

DOUGLAS B. COMER

Attesting Officer

Acting Commissioner of Patents and Trademarks